May 31, 1966            ISAMU OTA            3,253,692
AUTOMATIC CART-LIFTING APPARATUS WITH STATIONARY STAIRS
Filed April 11, 1963            2 Sheets-Sheet 1
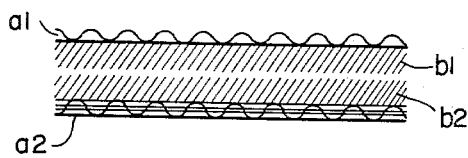
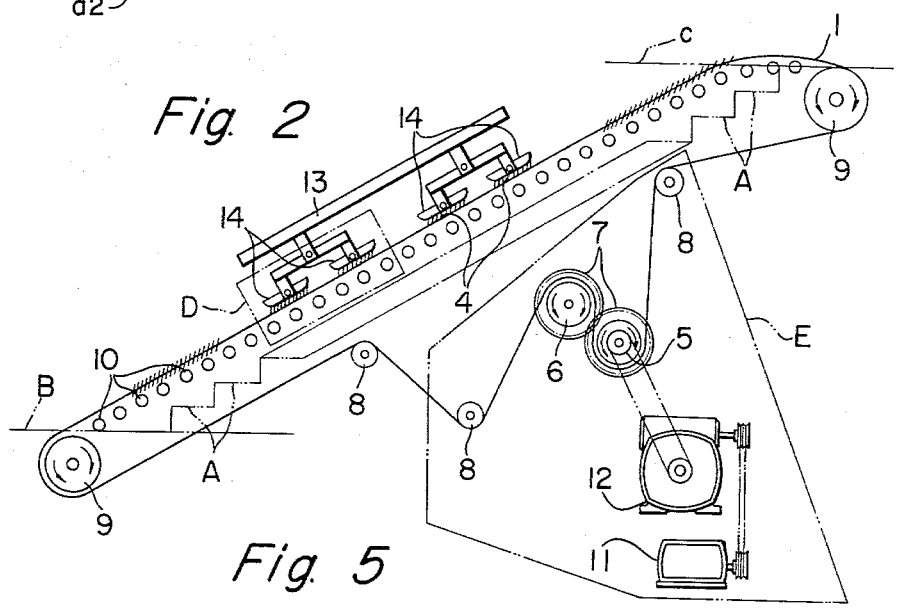
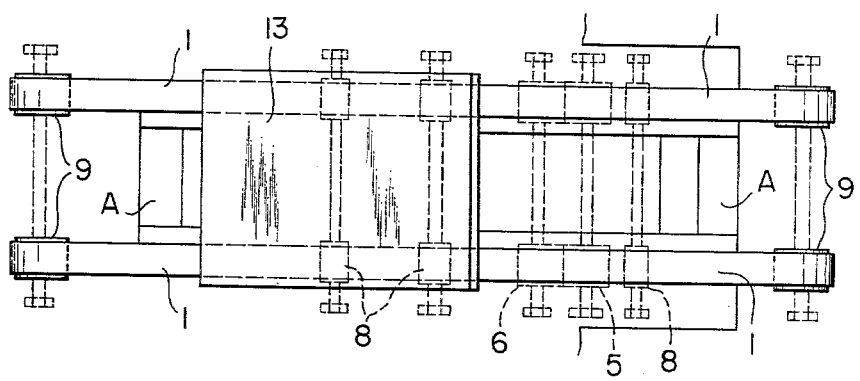
INVENTOR.
ISAMU OTA.
BY
ATTORNEY.

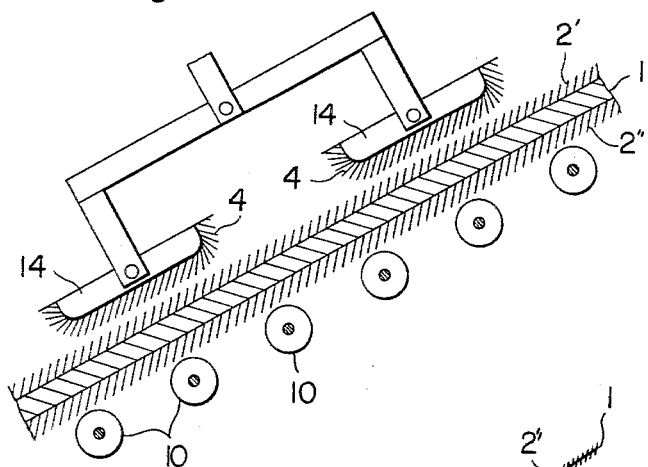
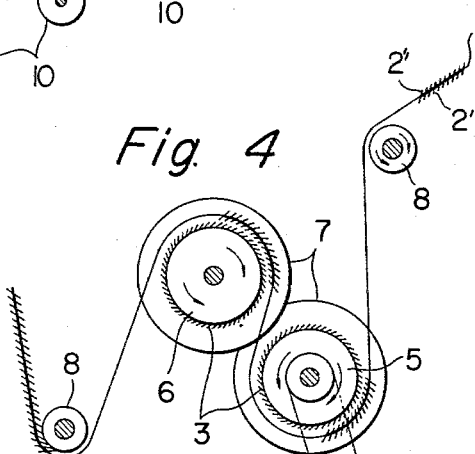
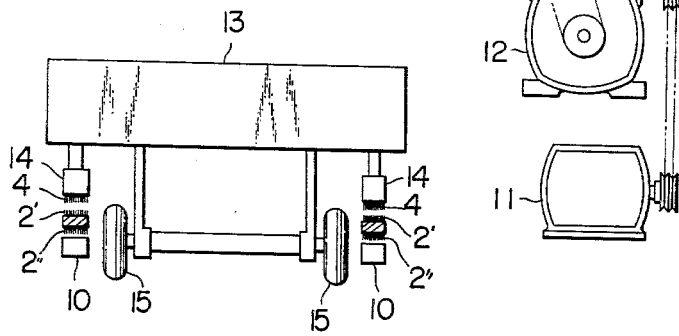

3,253,692
AUTOMATIC CART-LIFTING APPARATUS
WITH STATIONARY STAIRS
Isamu Ota, 1169, Suita-City, Osaka Prefecture, Japan
Filed Apr. 11, 1963, Ser. No. 272,295
3 Claims. (Cl. 198—1)

The present invention relates to an automatic cart lift to be incorporated with ordinary stairs.

One object of this invention is to provide an automatic cart lift to be incorporated with ordinary stairs, which can be driven without need for lubricating oil, thereby reducing the work necessary to keep the apparatus and immediate surroundings clean.

Another object of this invention is to provide relatively noiseless automatic cart lift to be incorporated with ordinary stairs, which can be operated in comfortable environment at the working station.

Another object of this invention is to provide an automatic cart lift to be incorporated with ordinary stairs, which requires no additional transmission means for lifting the cart, and, therefore, can be utilized economically, easily and without danger.

These and other objects and features of the invention will be more apparent from the following description, reference being made to the accompanying drawings, wherein:

FIG. 1 is an enlarged view showing the manner of engaging the pile of the belt with the pile of the sled in accordance with the invention;

FIG. 2 is a general side elevational view of one embodiment of a belt type automatic cart lift to be incorporated with ordinary stairs in accordance with the invention;

FIG. 3 is a detailed view showing on a larger scale, the part enclosed by broken line D in FIG. 2;

FIG. 4 is a detailed view showing on a larger scale, the part enclosed by broken line E in FIG. 2;

FIG. 5 is a general plan view showing the relationship between the steps of the stairs and the endless conveyer belts, wherein the parts A indicate the steps; and FIG. 6 is a front elevational view showing a cart and belts in accordance with the invention.

Referring to the drawings, in which one embodiment of the invention is shown, two groups of dense short pile 2', 2", made of fine thermoplastic synthetic fibers, are provided on the outer and inner surfaces of endless conveyor belts 1 respectively by heat setting, the pile in each of said groups being set in such manner that the pile on the ascending section of the belt, when seen in longitudinal section perpendicular to the plane of the belt as shown in FIGS. 3 and 4, is directed upward in the direction of the inclination of the belt, while on each of the outer peripheral surfaces of the driving wheels 5 and 6 are set groups of dense short piles 3, respectively, the pile in each of said groups being set in such manner that as seen in cross section of said driving wheels as shown in FIG. 4 in a manner lying down on said outer peripheral surfaces of said driving wheels so as to engage with the piles of said belt. The endless conveyer belt 1 is driven by either of the driving wheels 5 and 6 in cooperation with guide rollers 9 for supporting said belt in position, said endless conveyer belts being supported by a series of back up rollers 10 for positioning the belts in the plane of operation. Depending from the cart 13 at a location laterally spaced beyond the wheels 15 of the cart 13 are a suitable number of sleds 14, which engage with the flat plane of the belts 1 in a manner overriding on the conveyer belts 1, the bottom surfaces of each of said sleds 14 being provided with a dense short pile 4 by heat setting in a manner that the directions of said pile being set in the direction opposite to that of the advancing cart 13 as shown in FIGS. 2 and 3. Since the direction of advance of said cart 13 is predetermined to one direction because of the orientation of the piles 4, of each sleds, the direction of positioning the cart 13 on the belts 1 is limited to the same direction of the cart in both ascending and descending operation, the direction of orentation of the piles of the sleds being opposed against the piles on the belt 1 as shown in FIG. 3 so as to engage tightly with each other.

Either of the driving wheels 5 and 6 can be driven in clockwise direction alternately by switching the power drive which comprises a conventional type $a$ motor 11, a reduction gear 12 and gears 7 connected with the driving wheels 5 and 6, respectively, as shown in FIG. 4, while the other wheel not driven can run idle for free rotation. When the driving wheel 5 is driven in clockwise direction, the pile 3 on the wheel 5 engage with the pile 2" on the inner surface of the belt 1 in a manner as shown in FIG. 4, the pile on the wheel 5 being held tightly with piles on the belt 1 as if a great number of fine teeth of a gear is engaged with those of the other gear, and the belt is driven in clockwise direction over the wheel 5, while the wheel 6 is rotated freely in idle rotation, so that the belt 1 is moved for ascending operation. If a cart 13 is moved on to the upper surface of the belts 1 at the lower end thereof with the bottom surfaces of the sleds 14 being kept in contact with the surface of each belt 1, piles 4 on the sleds 14 engage with the piles 2' on the outer surface of each belt 1 in the same manner as in case of engagement between the piles of driving wheel 5 and the belt 1 described above, therefore, the cart is lifted entrained with the ascending movement of the belts 1, i.e. the driving wheel 5 effects an ascending operation. During the driving of the wheel 5, the driving wheel 6 is rotated freely in counterclockwise direction.

When the driving wheel 6 is driven in clockwise direction and the wheel 5 is idled, the pile 3 on the outer periphery of said wheel 6 engage with the pile 2' on the outer surface of the belt 1, the belt 1 is driven clockwise over the periphery of said wheel 6, and, as a result, the belt 1 is caused to effect a descending operation. Therefore, when a cart is moved on to the belts 1 at the upper end thereof with the bottom surfaces of the sleds 14 being kept in contact with the outer surface of the belts 1, the cart 13 being oriented so that the direction of the piles 4 of the sleds 14 oppose the piles 2' of the belt 1, the engagement between the piles 4 and 2' can be effected as previously mentioned preventing the slipping of the cart 13 downward on the belts 1, whereby descending operation of the cart 13 is effected without danger, i.e. the driving wheel 6 effects a descending operation.

The sleds 14 are positioned in suitable position so that the cart 13 may freely be moved upward and downward by the belts 1 with sleds 14 being kept in contact with the belts 1, while the wheels 15 of the cart 13 are spaced from the steps without effecting any disturbance of the operation of the belts 1.

A belt drive power device is disclosed in the U.S. Patent No. 2,941,410, in which the action of engagement of piles $b_1$ and $b_2$, when the seal belts $a_1$ and $a_2$ are pressed to each other as shown in FIG. 1, is utilized. The invention of this application is an improvement of said patent.

The endless belts 1 are provided along both sides of the steps A of the stairs as shown in FIGS. 2 and 5, the belts 1 and the steps interconnecting floors B and C. All the devices necessary for driving the belts 1 can be positioned in any suitable manner, for example, as shown in FIGS. 2, 4 and 5.

The tension rollers 8 shown in FIGS. 2 and 4 effects in tensioning the belt 1 for keeping the belt 1 in steady effective tension.

As described above, the apparatus in accordance with the invention of this application does not require large space, the belts 1 being merely mounted along both sides of the steps A. The carts 13 can be easily ascended or descended between the floors B and C by means of the belts 1, while men can walk on the steps when the carts are not operated.

Since the sleds 14 are depending from the cart 13 at a location laterally spaced beyond the wheels 11 of the cart 13 and do not interfere with the floor, the cart can freely be moved on a horizontal plane, therefore, the cart can easily be transported from any position in one floor to any position in any floor other than said one floor without danger. This provides significant convenience in practical uses.

In utilizing the apparatus in accordance with the invention, any additional mechanical power transmitting mechanism for lifting the cart in the prior art is not required and carts can be transported continuously.

After installing up this apparatus, no lubricant is required for operation of the belts 1, so dirting of the belt and immediate surroundings is avoided, and servicing of belt 1 is not necessary. This reduces maintenance costs.

The use of pile eliminates noise and provides a comfortable environment at the working station. This makes the apparatus suitable for use in three dimensional transportation of articles where noise and dirt must be prevented.

The apparatus in accordance with this invention has further advantage that it can easily be mounted on any stairs without requiring any large space for installation.

What is claimed is:

1. A conveyor system comprising and endless belt body having piles of fibers on at least one face making an acute angle therewith and means for driving said belt comprising a pulley having piles of fibers on the face thereof interdigitated with the piles on the belt, and a load on said conveyor having piles of fibers interdigitated with the piles on the belt.

2. A conveyor system comprising a conveyor belt mounted on each side of said flight of stairs, each belt being trained about rollers located at each end of said flight and comprising an endless body having piles of fibers on at least one face, means for driving each of said belts comprising a pulley having piles of fibers on the face thereof interdigitated with the piles on the belt, and a cart having at least one support in engagement with each belt, each said support having piles of fibers secured thereon interdigitated with the piles on the belt.

3. A conveyor system comprising a conveyor belt mounted on each side of said flight of stairs, each belt being trained about rollers located at each end of said flight and comprising an endless body having piles of fibers on opposite faces thereof, means for driving each of said belts comprising a pair of pulleys having piles of fibers on the faces thereof interdigitated with the piles on the belt, one pulley being in engagement with one face of the belt and the other pulley being in engagement with the opposite face, and a cart having at least one support in engagement with each belt, each said support having piles of fibers secured thereon interdigitated with the piles on the belt.

References Cited by the Examiner

UNITED STATES PATENTS

| | | | |
|---|---|---|---|
| 751,999 | 2/1904 | Reno | 104—171 |
| 823,892 | 6/1906 | Parkes | 198—193 X |
| 2,674,347 | 4/1954 | Thompson | 187—12 |
| 2,941,410 | 6/1960 | Ota | 198—203 X |
| 3,014,556 | 12/1961 | Stelzer | 187—12 |

SAMUEL F. COLEMAN, *Primary Examiner.*

WILLIAM B. LABORDE, *Examiner.*

R. J. HICKEY, *Assistant Examiner.*